United States Patent [19]
Chiu

[11] Patent Number: 5,178,466
[45] Date of Patent: Jan. 12, 1993

[54] PACIFIER THERMOMETER

[75] Inventor: Kun-Huang Chiu, No. 4, Lane 27, Sec. 6 Fu An Road, Tainan, Taiwan

[73] Assignees: Kun-Huang Chiu, Tainan; Chia-Chen Wu, Taipei, both of Taiwan

[21] Appl. No.: 804,556

[22] Filed: Dec. 10, 1991

[51] Int. Cl.$^5$ .............................. A61J 9/02; A61J 9/08
[52] U.S. Cl. .................... 374/151; 215/11.2; 128/736
[58] Field of Search ............. 374/151; 128/736, 234; 215/11.2; 206/306

[56] References Cited

U.S. PATENT DOCUMENTS

| | | | |
|---|---|---|---|
| 2,953,921 | 9/1960 | Muncheryan | 215/11.2 |
| 2,981,108 | 4/1961 | Andersen et al. | 215/11.2 |
| 4,447,164 | 5/1984 | Berndt | 374/151 |
| 4,689,621 | 8/1987 | Kleinberg | 128/736 X |
| 5,013,160 | 5/1991 | Massey et al. | 374/151 |
| 5,021,060 | 6/1991 | Lu | 374/151 X |
| 5,033,864 | 7/1991 | Lasecki et al. | 128/736 X |

FOREIGN PATENT DOCUMENTS

| | | | |
|---|---|---|---|
| 0166069 | 1/1986 | European Pat. Off. | 374/151 |
| 39434 | 4/1981 | Japan | 374/151 |

*Primary Examiner*—Daniel M. Yasich
*Attorney, Agent, or Firm*—Lowe, Price, LeBlanc & Becker

[57] ABSTRACT

A pacifier thermometer of the present invention is made of plastic material, preferably silicone, having a cover to protect a nipple, a frame having a hole at the center portion that is concentric with both an annular projection at the convex side and a stop shoulder formed between the hole and the projection, a nipple having an inner hole at the top closed end and a circumferential flange at the bottom open end, an electronic compartment having a cap with an extending nodule at the center portion of one side that has a concentric hole formed in the nodule, a shell with a transparent window, and a circuit board that includes a chip, an LCD, and a speaker. When sensing temperature, the sensor sends the signal to the chip, which decodes the signal into a frequency signal, and then sends the frequency signal to a comparator for comparison with a prestored frequency range. The comparator then displays the reading on the LCD. Should the sensed temperature, after comparison, be either higher or lower than the prestored temperature range, a warning signal is sounded from a speaker to call special attention from the guardian to the patient.

5 Claims, 5 Drawing Sheets

PACIFIER THERMOMETER

TECHNICAL FIELD

This invention relates to a pacifier thermometer, and more particularly to a pacifier including a temperature sensor therein to orally measure a baby's temperature with a digital display to display the temperature reading.

BACKGROUND ART

The thermometer has long been used to measure body temperature for precise medical treatment due to illness and also for many other reasons.

There are two popular types being used. The first type is a glass tube type having mercury sealed at the bottom portion therein, and with marks thereon for measurement reading. The second type is a digital display type which has a sensor at the frontmost end, and an LCD to display the temperature reading.

Although the two types are popular and widely adapted both by hospital and families, they have some defects. For instance, when rectally measuring a baby's temperature, the insertion into the rectum of the baby would be uncomfortable, and may even hurt the baby's inner skin of the rectum. If orally measuring a baby's temperature, the baby may accidentally bite and break the thermometer, thus possibly swallowing the mercury or cutting their mouth on the broken glass.

Therefore, the inventor has invented a pacifier thermometer which has a temperature sensor to measure body temperature of a baby sucking the pacifier. This will diminish the possibility of injury from broken glass or the baby's rejection or fear of an unknown object.

DISCLOSURE OF THE INVENTION

It is the primary object of the present invention to provide a pacifier thermometer which is safe to use.

It is another object of the present invention to provide a pacifier thermometer which diminishes the baby's rejection of unfamiliar temperature measuring devices.

It is still another object of the present invention to provide a pacifier thermometer which is easy to read.

It is a further object of the present invention to provide a pacifier thermometer which is more accurate.

It is still a further object of the present invention to provide a pacifier thermometer which is easy to operate.

It is still a further object of the present invention to provide a pacifier thermometer which is inexpensive to manufacture.

BEST MODE FOR CARRYING OUT THE INVENTION

Figure 1:
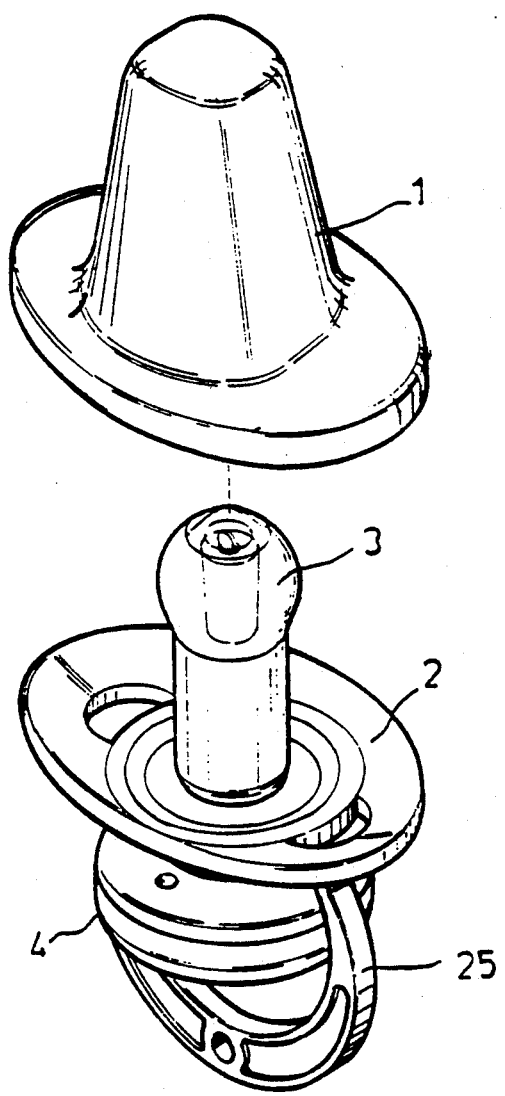
FIG. 1 is a perspective view of the present invention.
Figure 2:
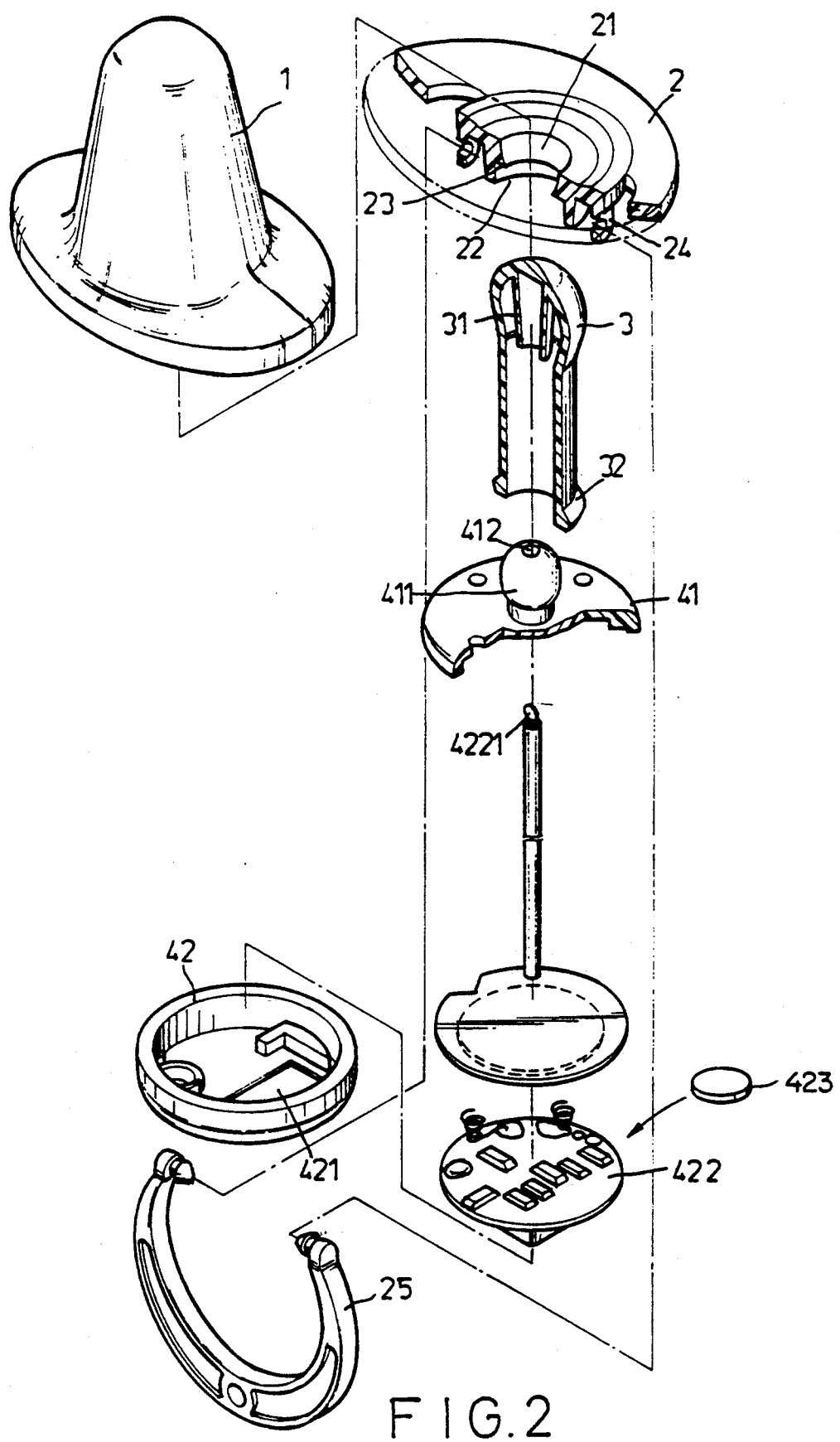
FIG. 2 is a fragmentary view of the present invention.

In reference to the drawings, wherein the figures are for the purpose of illustrating a preferred embodiment of the present invention only, and not for the purpose of limiting the same, FIGS. 1 and 2 show the present invention which is preferably made of silicone and which comprises a cover 1, an arcuate frame 2, a nipple 3, and an electronic compartment 4.

The contour of the arcuate frame 2 is formed like an ordinary nipple and includes a hole 21 at the center portion which is concentric with an annular projection 22 on the convex side of frame 2. Annular projection 22 has a larger inner diameter than that of the outer diameter of the hole 21. A stop shoulder 23 is formed in between hole 21 and annular projection 22. Two projecting posts 24, having respective holes at the center portion to accept respective open ends of an arm 25, are integrally formed on the concave side of frame 2.

The nipple 3 has a contour similar to that of an ordinary nipple and has a circumferential flange 32 at the open end extending outward with a diameter larger than that of hole 21 and smaller than that of annular projection 21, and an inner hole 31 at top portion of the closed end. When the nipple 3 is inserted through the hole 21 of the frame 2, the circumferential flange 32 is blocked by the edge of the hole 21 of the frame 2, and thus the nipple 3 is retained by the frame 2.

The electronic assembly 4 comprises a cap 41 and a shell 42. The cap 41 has a nodule 411 extending from one side of the center portion and including a concentric hole 412. The shell 42 has a transparent window 421 thereon, and a circuit board 422 therein. The circuit board 422 is essentially composed of a chip, a plurality of electronic parts, a speaker 423, an LCD and a sensor 4221 which is inserted through the hole 412 of cap 41, hole 21 of the frame 2, and disposed in the inner hole 31 of the nipple 3.

Figure 3:
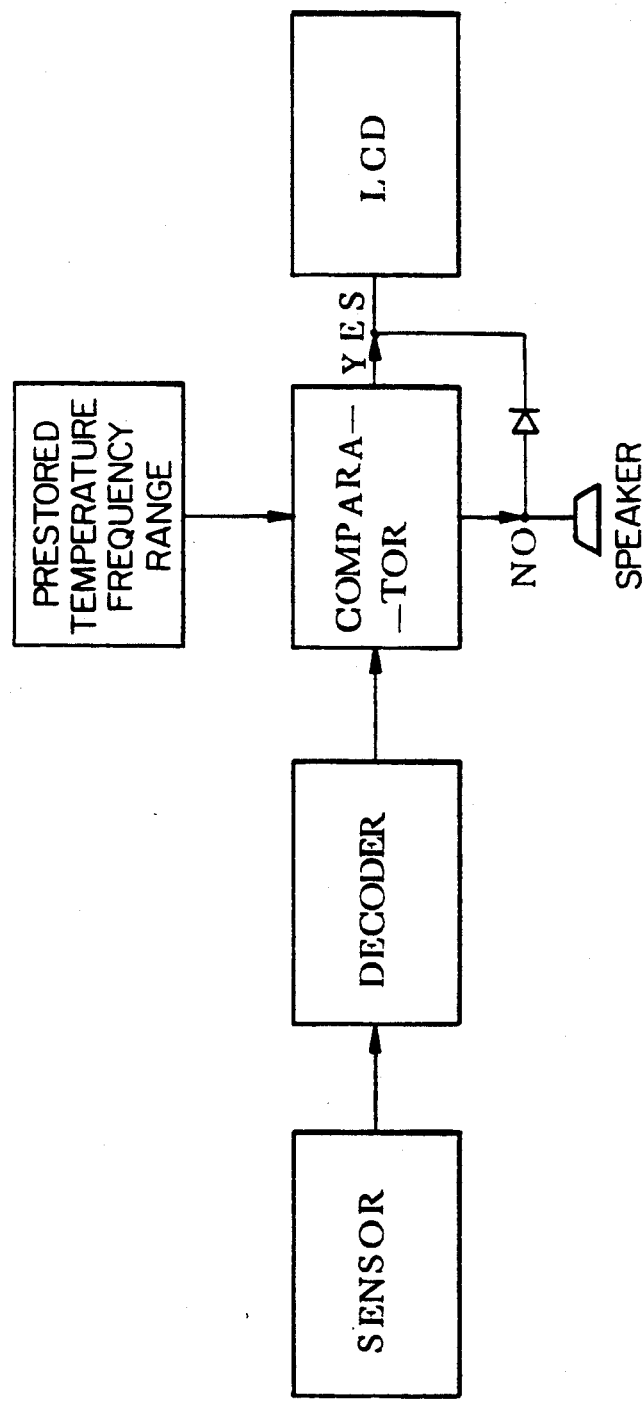
FIG. 3 is a block diagram of the present invention.

When sensing temperature, (as shown in FIG. 3) the sensor 4221 will output a signal to a decoder, which decodes the signal into a frequency-dependent signal, and then sends the frequency-dependent signal to a comparator for comparison with prestored frequency range corresponding to a preferred temperature range.

If the sensed frequency is within the prestored frequency range, the sensed frequency will be displayed on the LCD. Should the sensed frequency be higher than that of the prestored frequency range, the comparator will trigger the speaker to output a warning signal to the guardian or the care giver that the patient has a relatively high temperature and should go to a doctor immediately. Further, if the sensed temperature is greater than a tolerance limit, the LCD will display a "HI C" signal, or a "LO C" signal will be displayed if the sensed temperature is less than the tolerance limit. Likewise, if the sensed temperature is lower than the prestored range, the speaker will be triggered to output a warning signal.

A feature of the present invention is that once power is turned on, an alarm "BEEP" is generated after each minute, and is stopped after five minutes. The power will be automatically turned off after ten minutes. Another feature of the present invention is a Mode Selective Switch, (not shown in the figures) which enables the LCD to display temperature readings either in Centigrade mode or Fahrenheit mode.

Figure 4:
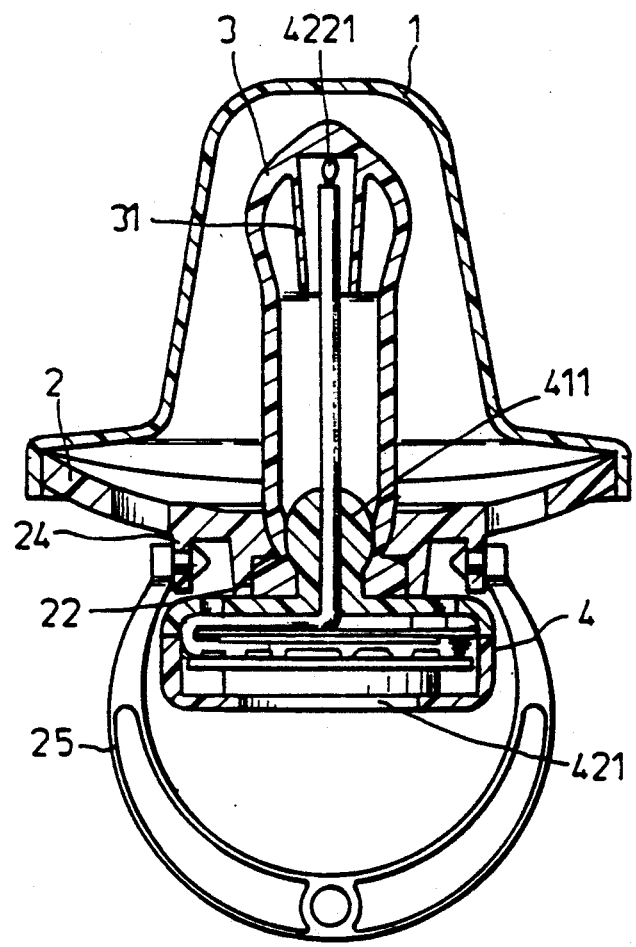
FIG. 4 is a cross-sectional view taken along line A—A of FIG. 1.
Figure 5:
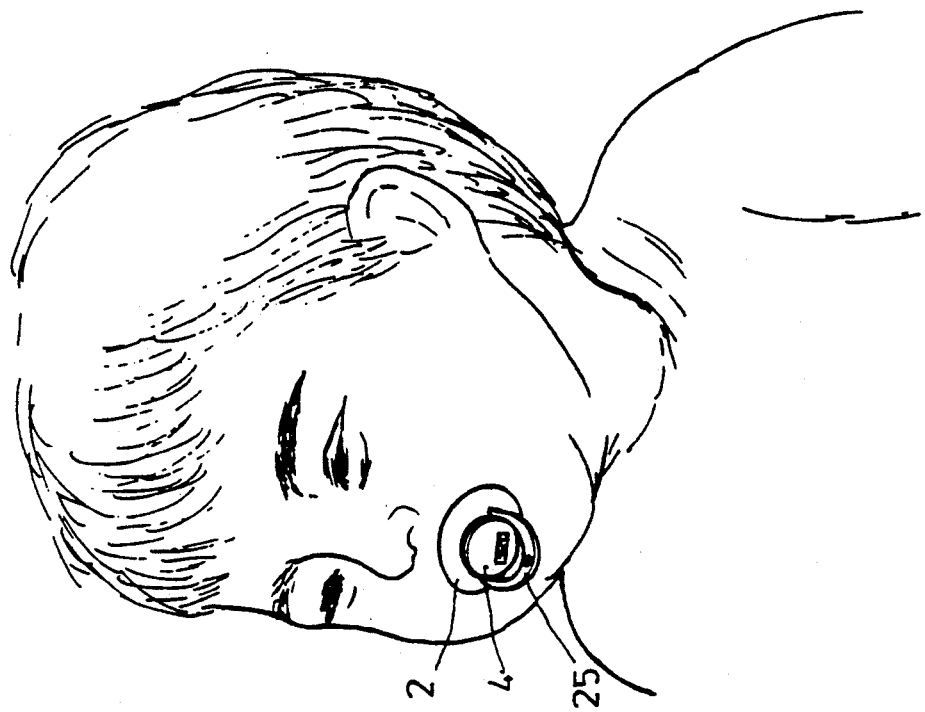
FIG. 5 is a perspective view showing the present invention in use.
Figure 5:

In assembly, the circuit board 422 is placed in the electronic compartment 4, with the sensor 4221 extending outward through the cap 412, inserted through the hole 21 and into inner hole 31 of the nipple 3. The nodule 411 of the cap 41 has an outer diameter slightly smaller than that of the inner diameter of the hole 21. Thus by inserting the nipple 3 into the hole 21 and then inserting the nodule 411 through the hole 21, the nodule 411 is tightly connected with the frame 2 as shown in FIG. 4, securing the electronic compartment 4 to the underside of the frame 2. The guardian or care giver may easily read the displayed body temperature from the outside, as shown in FIG. 5, without bothering the baby.

I claim:

1. A system for determining an infant's temperature, comprising:
    an arcuate-shaped frame with first and second curved surfaces with a central hole formed therethrough, and an annular projection and a stop shoulder coaxial with said central hole, said annular projection being formed on said first surface of said frame, with said stop shoulder also formed on said first surface and of a size intermediate the respective sizes of said central hole and said annular projection;
    a nipple having a closed end and a circumferential flange at an open end, said nipple also comprising an axial cylindrical inward extension inside said closed end;
    a cap with an axially extended nodule shaped and sized to fit securely to the frame;
    a shell with a transparent window, shaped and sized to fit to said cap to define an enclosed space; and
    a temperature sensor contained within said enclosed space and disposed to extend through said central hole in said frame so as to locate a temperature sensor within said cylindrical extension close to said closed end of said nipple, for sensing a temperature through said nipple, and an electronic circuit board for processing a sensed temperature to generate a useful output corresponding thereto.

2. A system for determining an infant's temperature according to claim 1, further comprising:
    an arm handle with two ends;
    said frame further includes a pair of projecting posts mounted on said lower surface of said frame, opposite each other, and
    each of said posts have a mounting hole; and wherein each said end of said arm handle is secured in said mounting hole.

3. A system for determining an infant's temperature according to claim 1, further comprising a nipple cover that encloses said nipple and said second surface of said frame.

4. A system for determining an infant's temperature according to claim 1, wherein
    said circuit board includes:
        electronic means for converting a signal from said sensor into a displayed temperature reading, and
        audio means for sounding a warning signal if said temperature reading is not within a predetermined range.

5. A system for determining an infant's temperature according to claim 4, wherein
    said electronic means includes a decoder for converting said signal from said sensor into a frequency-dependent signal, a comparator for comparing said frequency of said frequency-dependent signal with a predetermined frequency range, and an LCD display for displaying said temperature reading which corresponds to said frequency-dependent signal.

* * * * *